United States Patent [19]
Nishihara et al.

[11] Patent Number: 5,343,741
[45] Date of Patent: Sep. 6, 1994

[54] SYSTEM FOR DETERMINING PNEUMATIC TIRE PRESSURE FOR MOTOR VEHICLE BY COMPARING ACTUAL TO ADEQUATE WHEEL ROTATIONAL SPEED

[75] Inventors: Takeshi Nishihara; Keiyu Kin; Shuji Shiraishi, all of Tochigi, Japan

[73] Assignee: Honda Giken Kogyo Kabushiki Kaisha, Tokyo, Japan

[21] Appl. No.: 9,238

[22] Filed: Jan. 26, 1993

[30] Foreign Application Priority Data

Jan. 31, 1992 [JP] Japan .................................. 4-046016

[51] Int. Cl.$^5$ ...................... B60C 23/02; B60C 23/00
[52] U.S. Cl. ..................................... 73/146.2; 340/444
[58] Field of Search ................ 73/146.2, 146.5, 148; 340/443, 444; 364/424.03, 558

[56] References Cited

U.S. PATENT DOCUMENTS

| | | | |
|---|---|---|---|
| 3,613,075 | 10/1971 | Griffiths et al. | 73/146.2 |
| 3,691,524 | 9/1972 | Frost et al. | 340/444 |
| 4,224,597 | 9/1980 | DiCecio | 73/146 |
| 4,355,298 | 10/1982 | Jessup | 73/146.2 |
| 4,574,267 | 3/1986 | Jones | 73/146.2 |
| 4,876,528 | 10/1989 | Walker et al. | 340/444 |
| 5,192,929 | 3/1993 | Walker et al. | 73/146.5 |
| 5,212,640 | 5/1993 | Matsuda | 364/424.03 |
| 5,218,862 | 6/1993 | Hurrell, II et al. | 340/444 |

FOREIGN PATENT DOCUMENTS

| | | |
|---|---|---|
| 497120 | 8/1992 | European Pat. Off. ............ 340/444 |
| 3236520 | 4/1984 | Fed. Rep. of Germany . |
| 0497120 | 8/1992 | Fed. Rep. of Germany . |
| 2271063 | 12/1975 | France . |
| 0466535 | 5/1992 | France . |
| 54-033772 | 12/1979 | Japan . |
| 56-10202 | 3/1981 | Japan . |
| 63-305011 | 12/1988 | Japan . |
| 2-106415 | 4/1990 | Japan . |

*Primary Examiner*—Richard E. Chilcot, Jr.
*Assistant Examiner*—William L. Oen
*Attorney, Agent, or Firm*—Armstrong, Westerman, Hattori, McLeland & Naughton

[57] ABSTRACT

A pneumatic tire pressure determining system on a motor vehicle detects an actual rotational speed difference between rotational speeds of front or rear left and right road wheels of the motor vehicle, detects an operating condition of the motor vehicle, and calculates an adequate rotational speed difference between rotational speeds of the front or rear left and right road wheels based on the detected operating condition of the motor vehicle. The system compares the adequate rotational speed difference and the actual rotational speed difference, and when the difference between the compared actual and adequate rotational speed differences exceeds a predetermined value, the system determines a pneumatic tire pressure reduction.

6 Claims, 2 Drawing Sheets

SYSTEM FOR DETERMINING PNEUMATIC TIRE PRESSURE FOR MOTOR VEHICLE BY COMPARING ACTUAL TO ADEQUATE WHEEL ROTATIONAL SPEED

BACKGROUND OF THE INVENTION

1. Field of the Invention

The present invention relates to a system for determining the pressure of a pneumatic tire for use on a motor vehicle such as an automobile, and more particularly to a pneumatic tire pressure determining system for determining a reduction in the pneumatic tire pressure when the difference between the rotational speeds of road wheels of a motor vehicle does not fall within a predetermined range that depends on an operating condition of the motor vehicle.

2. Description of the Prior Art

Known pneumatic tire pressure determining systems are disclosed in Japanese patent publication No. 56-10202 and Japanese laid-open patent publication No. 63-305011, for example.

The pneumatic tire pressure determining system disclosed in Japanese laid-open patent publication No. 63-305011 detects the angular velocities of four road wheels, i.e., front left, front right, rear left, and rear right road wheels, of a motor vehicle, calculates the sums of the angular velocities of diagonal pairs of road wheels, and compares the angular velocity of each of the road wheels with the average value of the angular velocities of the four road wheels if the difference between the calculated sums falls within a predetermined range, thereby determining a reduction in the pneumatic pressure in any of the tires of the road wheels.

The disclosed pneumatic tire pressure determining system cannot determine the pneumatic tire pressures highly accurately and hence is not highly reliable because only the angular velocities of the road wheels are used as a reference value. More specifically, the pneumatic tire pressure determining system can determine a reduction in the pneumatic tire pressure of one road wheel, but fails to detect which one of the tires of the road wheels has suffered such a pneumatic tire pressure drop. Furthermore, in the event that the pneumatic tire pressures of two or three road wheels have dropped with a resultant reduction in the average angular velocity, the system cannot determine whether the pneumatic tire pressures have decreased or not.

SUMMARY OF THE INVENTION

It is therefore an object of the present invention to provide a pneumatic tire pressure determining system which is capable of determining a reduction in the pneumatic tire pressures of a plurality of road wheels and also determining which road wheel has been subjected to a pneumatic tire pressure drop.

According to the present invention, there is provided a system for determining a reduction in the pneumatic tire pressure of road wheels on a motor vehicle, comprising first means for detecting an actual rotational speed difference between rotational speeds of front left and right road wheels of the motor vehicle, second means for detecting an operating condition of the motor vehicle, third means for calculating an adequate rotational speed difference between rotational speeds of the front left and right road wheels based on an output signal from the second means, and fourth means for comparing the adequate rotational speed difference calculated by the third means and the actual rotational speed difference detected by the first means, and determining a pneumatic tire pressure reduction when the difference between the compared actual and adequate rotational speed differences exceeds a predetermined value. The system determines an adequate rotational speed difference that is estimated from the operating condition of the motor vehicle if the pneumatic tire pressure is normal, compares the adequate rotational speed difference with the actual rotational speed difference between the front road wheels, and determines a pneumatic tire pressure reduction when the difference between the compared actual and adequate rotational speed differences exceeds the predetermined value.

According to the present invention, there is also provided a system for determining a reduction in the pneumatic tire pressure of road wheels on a motor vehicle, comprising first means for detecting an actual rotational speed difference between rotational speeds of rear left and right road wheels of the motor vehicle, second means for detecting an operating condition of the motor vehicle, third means for calculating an adequate rotational speed difference between rotational speeds of the front left and right road wheels based on an output signal from the second means, and comparing means for comparing the adequate rotational speed difference calculated by the third means and the actual rotational speed difference detected by the first means, and determining a pneumatic tire pressure reduction when the difference between the compared actual and adequate rotational speed differences exceeds a predetermined value. The system determines an adequate rotational speed difference that is estimated from the operating condition of the motor vehicle if the pneumatic tire pressure is normal, compares the adequate rotational speed difference with the actual rotational speed difference between the rear road wheels, and determines a pneumatic tire pressure reduction when the difference between the compared actual and adequate rotational speed differences exceeds the predetermined value.

The second means may comprise means for detecting a lateral acceleration of the motor vehicle and means for detecting a speed of the motor vehicle. The second means determines an operating condition of the motor vehicle based on a steering angle, a lateral acceleration, and a speed of the motor vehicle. If the steering angle is not zero and a lateral acceleration occurs, then the system can calculate a radius of curvature of an arc along which the motor vehicle runs, i.e., the adequate rotational speed difference, depending on the speed of the motor vehicle. If the steering angle is zero and a lateral acceleration occurs, then the system determines a pneumatic tire pressure reduction of any of the road wheels.

According to the present invention, there is further provided a system for determining a reduction in the pneumatic tire pressure of road wheels on a motor vehicle, comprising first means for detecting rotational speeds of drive and driven road wheels of the motor vehicle and calculating an actual ratio of slippage between the drive and driven road wheels based on the detected rotational speeds, second means for calculating an adequate ratio of slippage of the drive road wheels if the pneumatic tire pressure of the drive and driven road wheels is determined as normal from an operating condition of an engine of the motor vehicle, and comparing means for comparing the actual ratio of slippage calculated by the first means and the adequate ratio of slippage calculated by the second means, and determining a pneumatic tire pressure reduction when the difference between the compared actual and adequate ratios of slippage exceeds a predetermined value. The system determines an adequate ratio of slippage that is estimated if the pneumatic tire pressure is determined as normal from the operating condition of the engine, and determines a pneumatic tire pressure reduction when the difference between the compared actual and adequate ratios of slippage exceeds a predetermined value.

The system may further comprise means for disabling the comparing means if at least one of the following conditions a, b, c, d, e, f, g is satisfied:
  a: the motor vehicle is not running;
  b: the motor vehicle is braked;
  c: the motor vehicle is running on rough terrain;
  d: a lateral acceleration of the motor vehicle is not within a predetermined range;
  e: a steering angle of the motor vehicle is not in a predetermined range;
  f: a longitudinal acceleration of the motor vehicle is not within a predetermined range; and
  g: an engine output torque of the motor vehicle is not within a predetermined range. If at least one of the above conditions is satisfied, i.e., if the operating condition of the motor vehicle or the engine cannot accurately be detected, then the system does not carry out a process of determining a pneumatic tire pressure. Accordingly, the system can accurately determine a pneumatic tire pressure with high reliability.

The system may further comprise means for enabling the comparing means if a lateral acceleration of the motor vehicle falls within a predetermined range, a longitudinal acceleration of the motor vehicle falls within a predetermined range, a steering angle of the motor vehicle falls within a predetermined range, and an engine output torque of the motor vehicle falls within a predetermined range. If the lateral acceleration of the motor vehicle falls within the predetermined range, the longitudinal acceleration of the motor vehicle falls within the predetermined range, the steering angle of the motor vehicle falls within the predetermined range, and the engine output torque of the motor vehicle falls within the predetermined range, i.e., if the operating condition of the motor vehicle or the engine can accurately be detected, then the system carries out a process of determining a pneumatic tire pressure. Accordingly, the system can accurately determine a pneumatic tire pressure with high reliability.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
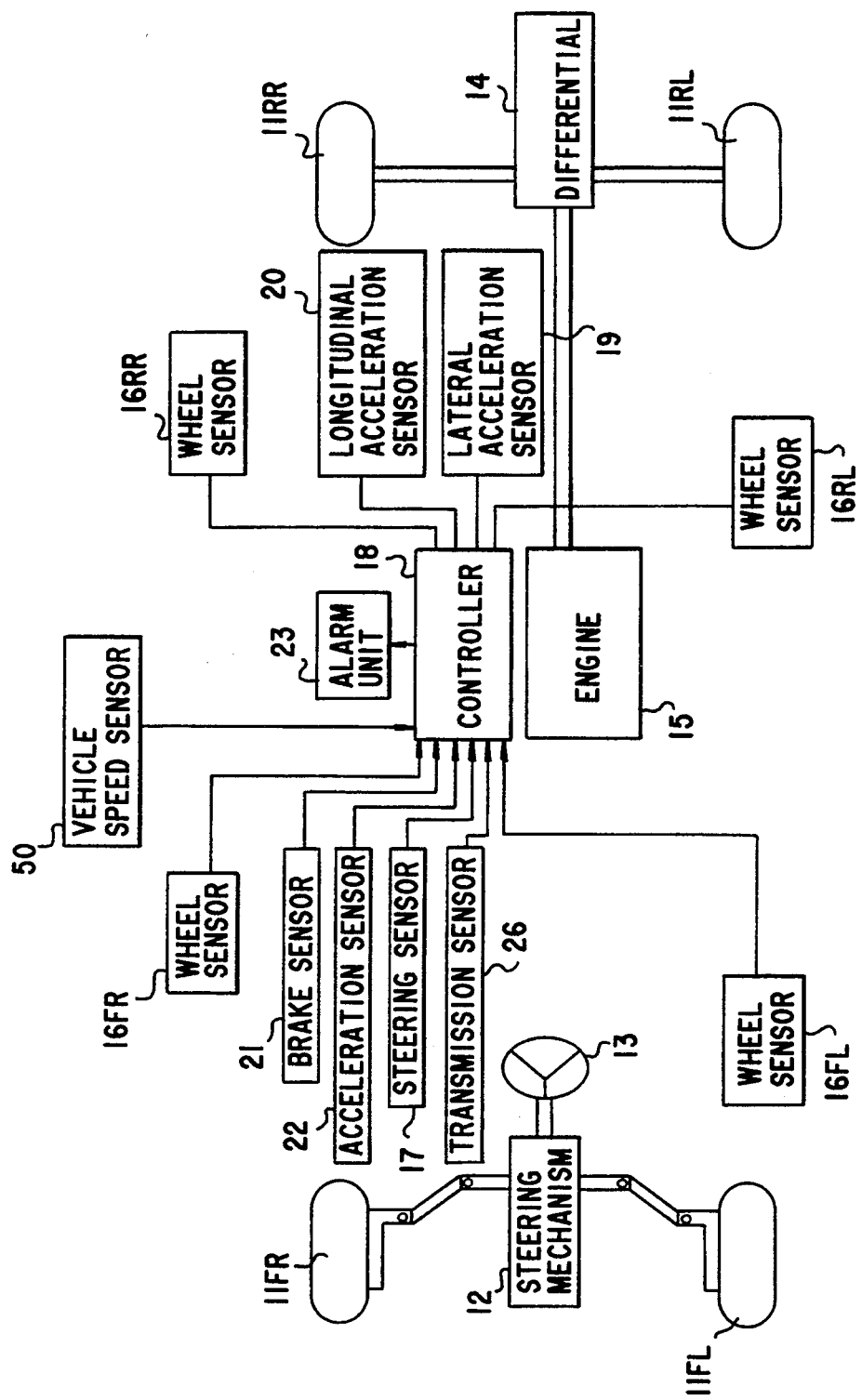
FIG. 1 is a block diagram of a system for determining a pneumatic tire pressure according to the present invention.

As shown in FIG. 1, a rear-wheel-drive motor vehicle such as an automobile has a front left road wheel 11FL, a front right road wheel 11FR, a rear left road wheel 11RL, and a rear right road wheel 11RR. The motor vehicle has a steering wheel 13 which is operatively coupled to the front left and right road wheels 11FL, 11FR through a known steering mechanism 12 for turning the front left and right road wheels 11FL, 11FR to steer the motor vehicle. The motor vehicle also has a power unit or engine 15 that is operatively connected to the rear left and right road wheels 11RL, 11RR through a final speed reducer mechanism or differential 14 for driving the rear left and right road wheels 11RL, 11RR.

A pneumatic tire pressure determining system according to the present invention is incorporated in the motor vehicle shown in FIG. 1, and includes wheel sensors 16FL, 16FR, 16RL, 16RR associated respectively with the front left road wheel 11FL, the front right road wheel 11FR, the rear left road wheel 11RL, and the rear right road wheel 11RR for individually detecting respective rotational speeds thereof, and a steering sensor 17 associated with the steering mechanism 12 for detecting a steering angle, i.e., an angle through which the steering wheel 13 has been turned. The wheel sensors 16FL, 16FR, 16RL, 16RR and the steering sensor 17 are electrically connected to a controller 18 of the pneumatic tire pressure determining system. To the controller 18, there are also electrically connected a lateral acceleration sensor 19 for detecting a lateral acceleration of the motor vehicle, i.e., an acceleration of the motor vehicle in the transverse direction thereof, a longitudinal acceleration sensor 20 for detecting a longitudinal acceleration of the motor vehicle, i.e., an acceleration of the motor vehicle in the longitudinal direction thereof, a brake sensor 21 for detecting a depressed stroke of the brake pedal of the motor vehicle, an accelerator sensor 22 for detecting a depressed stroke of the accelerator pedal of the motor vehicle, a transmission sensor 26 for detecting a gear position of the transmission of the motor vehicle, and an alarm unit 23 such as warning lamps, speakers, buzzers or the like. The longitudinal acceleration sensor 20 may comprise a differentiating circuit for calculating the derivatives of the rotational speeds of the road wheels, i.e., the accelerations of the road wheels, or a circuit for calculating a longitudinal acceleration from the difference between the rotational speeds of the front and rear road wheels.

Figure 2:
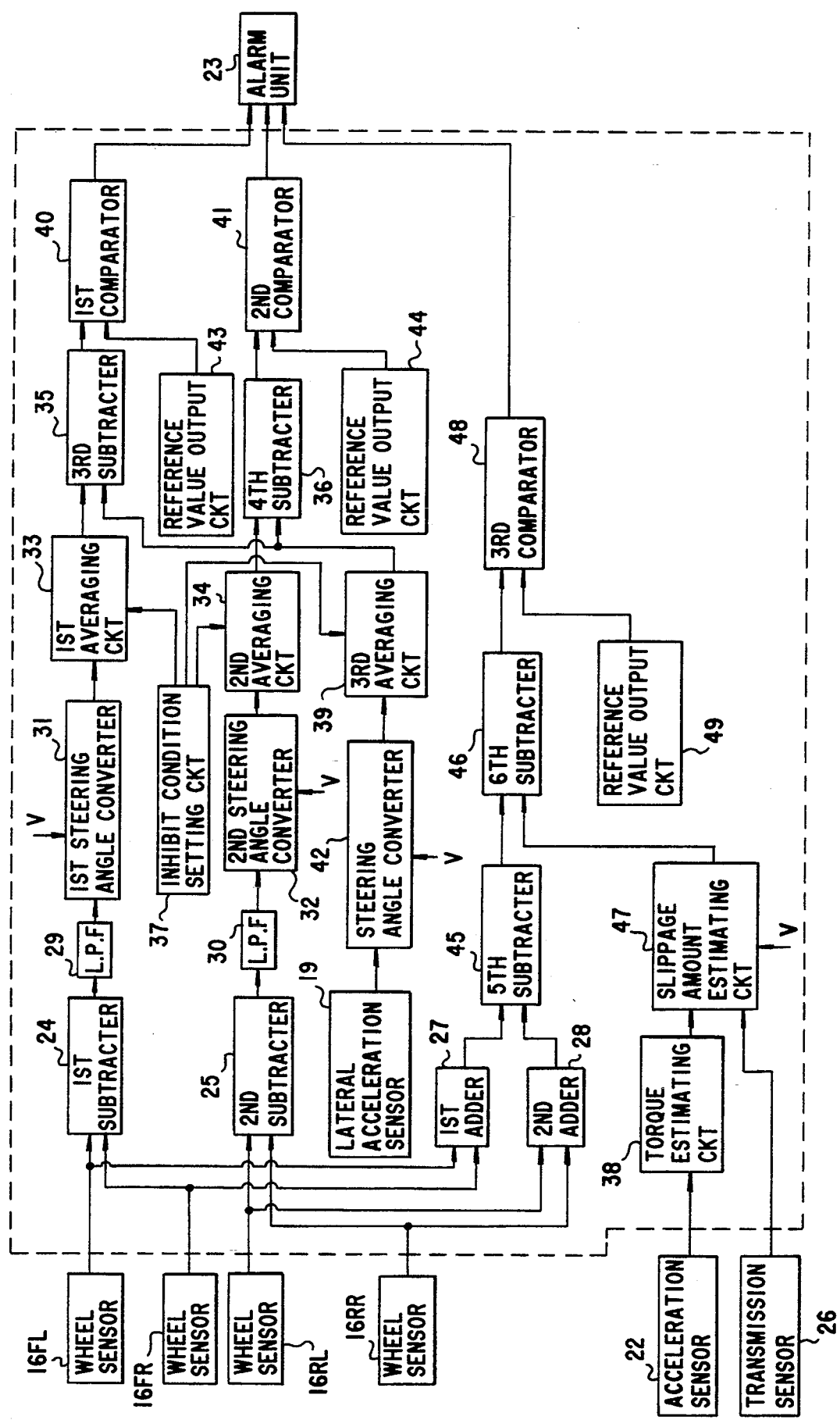
FIG. 2 is a detailed block diagram of a controller of the system shown in FIG. 1.

As shown in FIG. 2, the controller 18 has a first subtracter 24 and a first adder 27 which are connected to the wheel sensors 16FL, 16FR associated with the respective front left and right road wheels 11FL, 11FR, and a second subtracter 25 and a second adder 28 which are connected to the wheel sensors 16RL, 16RR associated with the respective rear left and right road wheels 11RL, 11RR. The first subtracter 24 is connected through a low-pass filter 29 to a first steering angle converter 31. The first subtracter 24 deducts an output signal of the wheel sensor 16FR from an output signal of the wheel sensor 16FL, and outputs a differential signal representative of the difference between the rotational speeds of the front left and right road wheels 11FL, 11FR. The second subtracter 25 is connected through a low-pass filter 30 to a second steering angle converter 32. The second subtracter 25 deducts an output signal of the wheel sensor 16RR from an output signal of the wheel sensor 16RL, and outputs a differential signal representative of the difference between the rotational speeds of the rear left and right road wheels 11RL, 11RR.

The first steering angle converter 31 is supplied with a vehicle speed signal V from a vehicle speed sensor 50 (see FIG. 1), and has an output terminal connected to a first averaging circuit 33. The first steering angle converter 31 calculates a steering angle from the differential signal from the first subtracter 24 and the vehicle speed signal V, and applies a signal indicative of the calculated steering angle to the first averaging circuit 33. The second steering angle converter 32 is also supplied with the vehicle speed signal V, and has an output terminal connected to a second averaging circuit 34. The second steering angle converter 32 calculates a steering angle from the differential signal from the second subtracter 25 and the vehicle speed signal V, and applies a signal indicative of the calculated steering angle to the second averaging circuit 34.

The vehicle speed sensor 50 may comprise a circuit for calculating an average value of the output signals from the wheel sensors 16FL, 16FR, so that the vehicle speed is represented by the average value of the rotational speeds of the front road wheels 11FL, 11FR that are driven road wheels.

The first and second averaging circuits 33, 34, to which an inhibit condition setting circuit 37 is connected, has output terminals connected to respective third and fourth subtracters 35, 36. The first averaging circuit 33 stores output signals from the first steering angle converter 31 during a predetermined period of time, updates the oldest stored data each time an output signal is supplied from the first steering angle converter 31, and calculates the average value of the output signals from the first steering angle converter 31 during the predetermined period of time. When a determination permission signal is supplied from the inhibit condition setting circuit 37, the first averaging circuit 33 applies a signal that represents the average value (estimated steering angle) of the calculated steering angles during the predetermined period of time, to the third subtracter 35. Similarly, the second averaging circuit 34 stores output signals from the second steering angle converter 32 during a predetermined period of time, updates the oldest stored data each time an output signal is supplied from the second steering angle converter 32, calculates the average value of the output signals from the second steering angle converter 32 during the predetermined period of time, and applies a signal that represents the average value (estimated steering angle) of the calculated steering angles during the predetermined period of time, to the fourth subtracter 36 when a determination permission signal is supplied from the inhibit condition setting circuit 37.

The inhibit condition setting circuit 37 has output terminals connected to the first and second averaging circuits 33, 34, as described above, and also to a third averaging circuit 39. The inhibit condition setting circuit 37 has input terminals connected to the vehicle speed sensor 50, the wheel sensors 16FL, 16FR, 16RL, 16RR, the steering sensor 17, the lateral acceleration sensor 19, the longitudinal acceleration sensor 20, the brake sensor 21, and a torque estimating circuit 38. The inhibit condition setting circuit 37 processes detected signals from these sensors and circuit, and outputs a determination inhibit signal when the vehicle speed is zero or in a low-speed range lower than a predetermined vehicle speed, or when the brake pedal is depressed to brake the motor vehicle, or when the road wheels suffer rotational vibrations as upon traveling on rough terrain, or when the lateral acceleration is not in a predetermined range, or when the steering angle is not in a predetermined range, or when the longitudinal acceleration is not in a predetermined range, or when the output torque of the engine is not in a predetermined range, and outputs a determination permission signal otherwise. The torque estimating circuit 38 estimates the output torque of the engine based on the output signal from the accelerator sensor 22.

The third subtracter 35 has one input terminal connected to the output terminal of the first averaging circuit 33 and the other input terminal to the output terminal of the third averaging circuit 39. The third subtracter 35 has its output terminal connected to a first comparator 40. The third subtracter 35 is supplied with a signal, which represents the estimated steering angle calculated based on the difference between the rotational speeds of the front left and right road wheels 11FL, 11FR, from the first averaging circuit 33, and a signal, which represents an adequate steering angle (described later on), from the third averaging circuit 39, and subtracts one of the supplied signals from the other to output a signal indicative of the angular difference between the estimated steering angle and the adequate steering angle. Likewise, the fourth subtracter 36 has one input terminal connected to the output terminal of the second averaging circuit 34 and the other input terminal to the output terminal of the third averaging circuit 39. The fourth subtracter 36 has its output terminal connected to a second comparator 41. The fourth subtracter 36 is supplied with a signal, which represents the estimated steering angle calculated based on the difference between the rotational speeds of the rear left and right road wheels 11RL, 11RR, from the second averaging circuit 34, and a signal, which represents the adequate steering angle from the third averaging circuit 39, and subtracts one of the supplied signals from the other to output a signal indicative of the angular difference between the estimated steering angle and the adequate steering angle. Each of the angular differences calculated by the subtracters 35, 36 is based on one, used as a reference, of the rotational speeds of the left and right road wheels, and is positive when one is greater than the other and negative when one is smaller than the other.

The third averaging circuit 39 has an input terminal connected to the inhibit condition setting circuit 37 and another input terminal connected to a steering angle converter 42. The steering angle converter 42 has input terminals connected to the lateral acceleration sensor 19 and the vehicle speed sensor 50. The steering angle converter 42 has a data table which stores steering angles in relation to lateral accelerations using vehicle speeds as parameters when the road wheels 11FL, 11FR, 11RL, 11RR have normal pneumatic tire pressures. Based on the lateral acceleration detected by the lateral acceleration sensor 19 and the vehicle speed detected by the vehicle speed sensor 50, the steering angle converter 42 searches the data table for an adequate steering angle, i.e., a steering angle when the pneumatic tire pressures of the road wheels 11FL, 11FR, 11RL, 11RR are normal, and applies an output signal representative of the adequate steering angle to the third averaging circuit 39. In response to the determination permission signal from the inhibit condition setting circuit 37, the third averaging circuit 39 calculates an average value of adequate steering angles during a predetermined period of time, and outputs a signal indicative of the average adequate steering signal to the third and fourth subtracters 35, 36.

The first comparator 40 has two input terminals connected respectively to the third subtracter 35 and a reference value output circuit 43, and an output terminal connected to the alarm unit 23. The reference value output circuit 43 outputs a signal indicative of a certain range having a predetermined width with a central value of 0, to the first comparator 40. When the output signal from the third subtracter 35 does not fall within, or exceeds, the range of the output signal from the reference value output circuit 43, the first comparator 40 outputs a drive signal depending on the direction in which the output signal from the third subtracter 35 exceeds the range from the reference value output circuit 43, to the alarm unit 23. More specifically, as described above, the output signal from the third subtracter 35 is positive or negative depending on which one of the rotational speeds of the front left and right road wheels 11FL, 11FR is higher than the other. Therefore, if the output signal from the third subtracter 35 exceeds the range of the output signal from the reference value output circuit 43 in a positive direction, then it can be determined that the pneumatic tire pressure of the front left road wheel 11FL has dropped, and if the output signal from the third subtracter 35 exceeds the range of the output signal from the reference value output circuit 43 in a negative direction, then it can be determined that the pneumatic tire pressure of the front right road wheel 11FR has dropped. The first comparator 40 now outputs a drive signal indicating that the pneumatic tire pressure of either the front left road wheel 11FL or the front right road wheel 11FR has dropped. Similarly, the second comparator 41 has two input terminals connected respectively to the fourth subtracter 36 and a reference value output circuit 44, and an output terminal connected to the alarm unit 23. When the output signal from the fourth subtracter 36 exceeds the range of the output signal from the reference value output circuit 44, the second comparator 41 outputs a drive signal depending on the direction in which the output signal from the fourth subtracter 36 exceeds the range from the reference value output circuit 44, to the alarm unit 23.

The first and second adders 27, 28 have respective output terminals connected to respective input terminals of a fifth subtracter 45 whose output terminal is connected to an input terminal of a sixth subtracter 46. The fifth subtracter 45 subtracts an output signal of the second adder 28 from an output signal of the first adder 27 to calculate the difference between the rotational speeds of the front and rear road wheels, i.e., an amount of slippage (actual amount of slippage) of the front and rear road wheels per unit time, and outputs a signal representative of the actual amount of slippage to the sixth subtracter 46. The sixth subtracter 46 has two input terminals, one connected to the fifth subtracter 45 and one to a slippage amount estimating circuit 47. The output terminal of the sixth subtracter 46 is connected to a third comparator 48. The sixth subtracter 46 is supplied with a signal indicative of an estimated amount of slippage from the slippage amount estimating circuit 47, and compares the output signal from the fifth subtracter 45 with the signal from the slippage amount estimating circuit 47, i.e., compares the actual amount of slippage with the estimated amount of slippage. The sixth subtracter 46 then outputs a signal indicative of the difference between the actual and estimated amounts of slippage, i.e., a slippage difference, to the third comparator 48.

The slippage amount estimating circuit 47 has two input terminals connected to the output terminal of the torque estimating circuit 38 and the vehicle speed sensor 50. The torque estimating circuit 38 has input terminals connected to the accelerator sensor 22 and the transmission sensor 26. The torque estimating circuit 38 has a first data table which stores engine output torques in relation to depressed strokes of the accelerator pedal and also has a second data table which stores drive forces for the rear road wheels 11RL, 11RR in relation to engine output torques using transmission gear ratios as parameters. In response to a detected depressed stroke of the accelerator pedal, used as an address, the torque estimating circuit 38 searches the first data table for an engine output torque. Then, the torque estimating circuit 38 searches the second data table for a drive force for the rear road wheels 11RL, 11RR based on the engine output torque determined from the first data table. The torque estimating circuit 38 now outputs a signal indicative of the drive force to the slippage amount estimating circuit 47. Based on the drive force signal from the torque estimating circuit 38 and the vehicle speed signal V from the vehicle speed sensor 50, the slippage amount estimating circuit 47 calculates an estimated amount of slippage of the rear road wheels, or determines it from a data table. The slippage amount estimating circuit 47 then applies a signal indicating the estimated amount of slippage to the sixth subtracter 46.

The third comparator 48 has two input terminals, one connected to the sixth subtracter 46 and one to a reference value output circuit 49. The third comparator 48 has its output terminal connected to the alarm unit 23. The reference value output circuit 49 outputs a reference value signal indicative of a certain range for determining which one of the front and rear road wheels is suffering a pneumatic tire pressure drop. The third comparator 48 compares the output signal from the sixth subtracter 46 with the reference value signal from the reference value output circuit 49. When the output signal from the sixth subtracter 46 exceeds the signal range of the reference value output circuit 49, the third comparator 48 outputs a drive signal depending on whether the output signal from the sixth subtracter 46 exceeds the signal range of the reference value output circuit 49 in a positive or negative direction. More specifically, when the slippage difference between the actual and estimated amounts of slippage exceeds the reference signal range, the third comparator 48 applies a drive signal depending on whether the output signal from the sixth subtracter 46 exceeds the reference signal range in a positive or negative direction, to the alarm unit 23.

The alarm unit 23 may comprise warning lamps or speakers corresponding to the respective pneumatic tire pressures of all the road wheels. In response to the drive signals from the first, second, and third comparators 40, 41, 48, the alarm unit 23 selectively energizes or turns on and off the warning lamps to warn the driver of the motor vehicle. Alternatively, the alarm unit 23 may selectively energize the buzzers to give audible warning sounds to the driver of the motor vehicle.

In this embodiment, a steering angle is estimated from the difference between the rotational speeds of the front left and right road wheels 11FL, 11FR, and an adequate steering angle is determined from the lateral acceleration on the assumption that the pneumatic tire pressures are normal. Insofar as the pneumatic tire pressures are normal, the estimated steering angle and the adequate steering angle agree to each other. If the pneumatic tire pressure of one of the front left and right road wheels 11FL, 11FR is lowered, then the radius of curvature of an arc along which the road wheel with the lowered pneumatic tire pressure is reduced, and the difference between the rotational speeds of the road wheels varies, resulting in a change in the estimated steering angle.

When the difference between the estimated steering angle of the front road wheels 11FL, 11FR and the adequate steering angle exceeds a predetermined value, the pneumatic tire pressure of one of the front left and right road wheels 11FL, 11FR is judged as being lowered. Therefore, even in the event of a reduction in the pneumatic tire pressure of the rear road wheels 11RL, 11RR, the system can accurately determine a reduction in pneumatic tire pressure of the front left and right road wheels 11FL, 11FR with high reliability. Since the adequate steering angle is calculated from the output signal from the lateral acceleration sensor 19, rather than the steering angle sensor, the steering angle sensor is not required to be highly accurate, and hence may be of a low cost.

Likewise, an estimated steering angle is calculated from the difference between the rotational speeds of the rear left and right road wheels 11RL, 11RR, and an adequate steering angle is determined from the lateral acceleration on the assumption that the pneumatic tire pressures are normal. When the difference between the estimated steering angle of the rear road wheels 11RL, 11RR and the adequate steering angle exceeds a predetermined value, the pneumatic tire pressure of one of the rear left and right road wheels 11RL, 11RR is judged as being lowered. Therefore, the system can accurately determine a reduction in pneumatic tire pressure of the rear left and right road wheels 11RL, 11RR with high reliability without being adversely affected by the pneumatic tire pressures of the front road wheels 11FL, 11FR.

The system according to the present invention also calculates the average value of the rotational speeds of the front road wheels 11FL, 11FR and the average value of the rotational speeds of the rear road wheels 11RL, 11RR, and determines an actual amount or ratio of slippage from the average value of the rotational speeds of the front road wheels 11FL, 11FR and the average value of the rotational speeds of the rear road wheels 11RL, 11RR. In addition, the system calculates an adequate (estimated) amount or ratio of slippage on the assumption that the pneumatic tire pressures are normal by estimating drive forces for the rear road wheels from the depressed stroke of the accelerator pedal and the gear ratio of the transmission. When the difference between the actual ratio of slippage and the adequate ratio of slippage exceeds a predetermined value, the system determines that the pneumatic tire pressures of the front or rear road wheels are reduced. Therefore, even in the event that the pneumatic tire pressures of the front and rear road wheels on the left or right side are lowered, the system can reliably determine that the pneumatic tire pressure of one of the front and rear road wheels is reduced. Inasmuch as the engine output torque is determined by processing the output signal from the accelerator sensor instead of a torque sensor, an expensive torque sensor is not required, making the cost of the system relatively low.

Based on the results of the above determination processes, the system actuates the alarm unit 23 to selectively energize or turn on and off the warning lamps, speakers, or buzzers corresponding to the road wheels which have suffered a pneumatic tire pressure reduction, thereby warning the driver of the motor vehicle. Therefore, the driver can recognize not only a pneumatic tire pressure drop, but also a tire which is suffering a pneumatic pressure reduction, so that the driver can quickly take a subsequent action to increase the pneumatic tire pressure or replace the tire.

The system according to the present invention does not determine whether a pneumatic tire pressure has dropped or not when at least one of the following conditions a, b, c, d, e, f, g is satisfied, i.e., the motor vehicle operates under a stable condition:
- a: the motor vehicle is not running;
- b: the motor vehicle is braked;
- c: the motor vehicle is running on rough terrain;
- d: the lateral acceleration of the motor vehicle is not within a predetermined range;
- e: the steering angle is not in a predetermined range;
- f: the longitudinal acceleration of the motor vehicle is not within a predetermined range; and
- g: the engine output torque is not within a pre-determined range.

Given the above conditions a, b, c, d, e, f, g, the system can determine a pneumatic tire pressure highly accurately and reliably.

The system according to the present invention may be arranged to determine a pneumatic tire pressure only when the lateral acceleration of the motor vehicle falls within a predetermined range, the longitudinal acceleration of the motor vehicle falls within a predetermined range, the steering angle falls within a predetermined range, and the engine output torque falls within a predetermined range. The system thus arranged can determine a pneumatic tire pressure highly reliably only when the motor vehicle is running highly stably.

In the illustrated embodiment, the system employs an intermediate quantity (physical quantity) such as a steering angle, a rate of slippage, or the like during a process of determining a pneumatic tire pressure. However, such an intermediate quantity is Given only by way of illustrative example. Instead, a yaw rate, a wheel speed difference or a lateral acceleration may be used for comparison, or a quantity different from the steering angle or the like may be employed. Particularly, if a yaw rate is to be employed instead of a lateral acceleration, then a yaw rate sensor may be used in place of the lateral acceleration sensor, and a steering angle may be calculated from an output signal from the yaw rate sensor for comparison with a steering angle determined from a wheel speed difference, or a yaw rate may be calculated from a wheel speed difference for comparison with a yaw rate detected by the yaw rate sensor. When the difference between the compared steering angles or yaw rates exceeds a predetermined value, the system may determine that the pneumatic tire pressure has dropped.

The system according to the present invention has been illustrated as being incorporated in a rear-wheel-drive motor vehicle. However, the principles of the present invention are also applicable to a front-wheel-drive motor vehicle.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A system for determining a reduction in the pneumatic tire pressure of road wheels on a motor vehicle, comprising:

first means for detecting an actual rotational speed difference between rotational speeds of front left and right road wheels of the motor vehicle;

second means for detecting an operating condition of the motor vehicle;

third means for calculating an adequate rotational speed difference between rotational speeds of the front left and right road wheels based on an output signal from said second means; and fourth means for comparing said adequate rotational speed difference calculated by said third means and said actual rotational speed difference detected by said first means, and determining a pneumatic tire pressure reduction when the difference between the compared actual and adequate rotational speed differences exceeds a predetermined value.

2. A system for determining a reduction in the pneumatic tire pressure of road wheels on a motor vehicle, comprising:

first means for detecting an actual rotational speed difference between rotational speeds of rear left and right road wheels of the motor vehicle;

second means for detecting an operating condition of the motor vehicle;

third means for calculating an adequate rotational speed difference between rotational speeds of the rear left and right road wheels based on an output signal from said second means; and comparing means for comparing said adequate rotational speed difference calculated by said third means and said actual rotational speed difference detected by said first means, and determining a pneumatic tire pressure reduction when the difference between the compared actual and adequate rotational speed differences exceeds a predetermined value.

3. A system according to claim 1 or 2, wherein said operating condition of said second means determined by detecting a lateral acceleration of the motor vehicle and detecting a speed of the motor vehicle.

4. A system for determining a reduction in the pneumatic tire pressure of road wheels on a motor vehicle, comprising:

first means for detecting rotational speeds of drive and non-drive road wheels of the motor vehicle and calculating an actual ratio of slippage between the drive and non-drive road wheels based on the detected rotational speeds;

second means for calculating an adequate ratio of slippage of the drive road wheels if the pneumatic tire pressure of the drive and non-drive road wheels is determined as normal from an operating condition of an engine of the motor vehicle; and comparing means for comparing said actual ratio of slippage calculated by said first means and said adequate ratio of slippage calculated by said second means, and determining a pneumatic tire pressure reduction when the difference between the compared actual and adequate ratios of slippage exceeds a predetermined value.

5. A system according to claim 1, 2, or 4, further comprising means for disabling said comparing means if at least one of the following conditions a, b, c, d, e, f, g is satisfied:

a: the motor vehicle is not running;
b: the motor vehicle is braked;
c: the motor vehicle is running on rough terrain;
d: a lateral acceleration of the motor vehicle is not within a predetermined range;
e: a steering angle of the motor vehicle is not in a predetermined range;
f: a longitudinal acceleration of the motor vehicle is not within a predetermined range; and
g: an engine output torque of the motor vehicle is not within a predetermined range.

6. A system according to claim 1, 2, or 4, further comprising means for enabling said comparing means if a lateral acceleration of the motor vehicle falls within a predetermined range, a longitudinal acceleration of the motor vehicle falls within a predetermined range, a steering angle of the motor vehicle falls within a predetermined range, and an engine output torque of the motor vehicle falls within a predetermined range.

* * * * *